(12) United States Patent
Moore et al.

(10) Patent No.: US 6,951,073 B2
(45) Date of Patent: Oct. 4, 2005

(54) TRANSPORTABLE, POSITIONABLE, DIRECTIONAL INSECT CONTROL SYSTEM

(76) Inventors: Gary Stephen Moore, 8914 San Leandro, Dallas, TX (US) 75218; Walter G. Dahlberg, 3636 Lovers La., Dallas, TX (US) 75225

( * ) Notice: Subject to any disclaimer, the term of this patent is extended or adjusted under 35 U.S.C. 154(b) by 0 days.

(21) Appl. No.: 10/700,262

(22) Filed: Nov. 3, 2003

(65) Prior Publication Data

US 2004/0098903 A1 May 27, 2004

Related U.S. Application Data

(60) Provisional application No. 60/423,543, filed on Nov. 4, 2002.

(51) Int. Cl.$^7$ .......................... A01M 5/02; A01M 7/00
(52) U.S. Cl. ...................................... 43/132.1; 43/124
(58) Field of Search ............................. 43/132.1, 900, 43/124, 125

(56) References Cited

U.S. PATENT DOCUMENTS

| | | | | |
|---|---|---|---|---|
| 1,926,579 A | * | 9/1933 | Burgess et al. ............... 422/27 |
| 2,201,995 A | * | 5/1940 | Erickson ....................... 43/125 |
| 2,745,210 A | * | 5/1956 | Hild ............................. 43/125 |
| 3,857,515 A | * | 12/1974 | Zennie ......................... 239/169 |
| 5,109,629 A | * | 5/1992 | King et al. ................. 43/132.1 |
| 5,501,032 A | * | 3/1996 | Pitman ......................... 43/129 |
| 5,921,019 A | * | 7/1999 | Baek ............................. 47/1.7 |
| 6,669,105 B2 | * | 12/2003 | Bryan et al. .................. 239/61 |

* cited by examiner

Primary Examiner—Michael J. Carone
Assistant Examiner—Bret Hayes
(74) Attorney, Agent, or Firm—Michael A. O'Neil

(57) ABSTRACT

A transportable, positionable, directionable insect control system comprising a frame supported on one or more wheels for movement over the underlying surface and a handle for use in positioning the insect control system. A tank is mounted on the frame and a pump is employed to discharge an insect controlling chemical agent from the tank under the operation of a control system. The pump directs the insect controlling chemical agent from the tank through conduits to one or more discharge nozzles for discharge therefrom. The discharge nozzles are positionable to control the direction of discharge of the insect controlling chemical agent.

12 Claims, 6 Drawing Sheets

TRANSPORTABLE, POSITIONABLE, DIRECTIONAL INSECT CONTROL SYSTEM

CLAIM OF PRIORITY

This application claims priority of provisional Application Ser. No. 60/423,543 filed Nov. 4, 2002, currently pending.

TECHNICAL FIELD

This invention relates generally to insect control systems, and more particularly to an insect control system which is transportable between selected locations, positionable at each selected location, and directionable to effect insect control exactly where needed.

BACKGROUND AND SUMMARY OF THE INVENTION

Insect control utilizing chemical agents is well known. As used herein the term insect controlling chemical agent includes pyrethrum, CEDARCIDE®, and other pesticides that need to be delivered by airborne misting. When properly applied insect controlling chemical agents are effective at controlling mosquitoes and other insects around homes, businesses, recreational areas, etc. The use of pyrethrum for insect control is highly desirable because it is a naturally occurring insect controlling chemical agent which is non-toxic to humans, pets and other animals, and plants.

Heretofore pyrethrum and other insect controlling chemical agents have typically been dispensed from permanently installed insect control misting systems. Permanently installed misting systems are advantageous in that they can be adapted to effect insect control throughout an entire property or facility. Permanently installed misting systems typically include automated control features which provide for the dispensing of pyrethrum and other insect controlling chemical agents at periodic intervals throughout the day.

Although permanently installed misting systems may also exhibit certain disadvantages. For example, permanently installed misting systems are often relatively expensive to purchase and install. Permanently installed misting systems often do not lend themselves to removal and reinstallation at a different location. It will therefore be understood that permanently installed misting systems are not typically used at facilities that are either rented or leased.

The present invention comprises a transportable, positionable, and directionable insect control misting system which overcomes the foregoing and other difficulties that have long since characterized the prior art. In accordance with the broader aspects of the invention, an insect control system is transportable between different locations at which insect control is required. The insect control system of the present invention is also positionable at each selected location and is also directionable so that insect control can be effected precisely where needed. The insect control of the present invention is relatively inexpensive to purchase and use, particularly when compared to permanently installed insect control systems.

In accordance with more particular aspects of the invention, a transportable, positionable, directionable insect control mister comprises a frame supported on one or more wheels for movement over the underlying surface, including rough surfaces and curbs. The frame may be provided with a handle to facilitate movement and positioning of the insect control system. The handle may be collapsible to facilitate transport and storage of the mister. The frame includes and/or supports a tank which receives an insect controlling chemical agent to be dispensed. The tank either comprises or is surrounded by a housing or shroud which also encloses a pump and a control system. The pump and the control system are powered by electricity received through typically an electrical cord, or by a rechargeable battery. A plurality of discharge arms are mounted on the housing and either comprise or support discharge passageways extending from the pump to discharge nozzles mounted at the distal ends of the arms. Extended discharge arms having lengths of 25 feet or more may also be used in the practice of the invention.

In the utilization of the insect control system of the present invention, the system may be transported to a location at which insect control is desired utilizing a pickup truck, SUV, or similar vehicle. At the selected location, the handle and the wheels are utilized to position the system at the precise location at which insect control is desired. Prior to or after positioning, the tank is filled with an appropriate concentration of a selected insect control chemical agent. The pump and the control system are activated utilizing an electric power supply through an electric cord, or from a rechargeable battery. Upon activation, the pump discharges the selected insect control chemical agent from the tank through the nozzles mounted at the distal ends of the arms. The pressure at which the insect control chemical agent is discharged and the time duration over which the discharge occurs are regulated by the control system. At the completion of the discharge cycle, the insect control system may be relocated to another area of the selected location requiring insect control.

One of the advantages derived from the use of the invention comprises the fact that the insect control system thereof is adapted to be used indoors. Indoor applications of the invention are typically characterized by different operating parameters as compared with those that characterize outdoor utilizations. The control system utilized in conjunction with the insect control system of the present invention is adapted to regulate the operation thereof in accordance with the requirements of a wide variety of applications.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
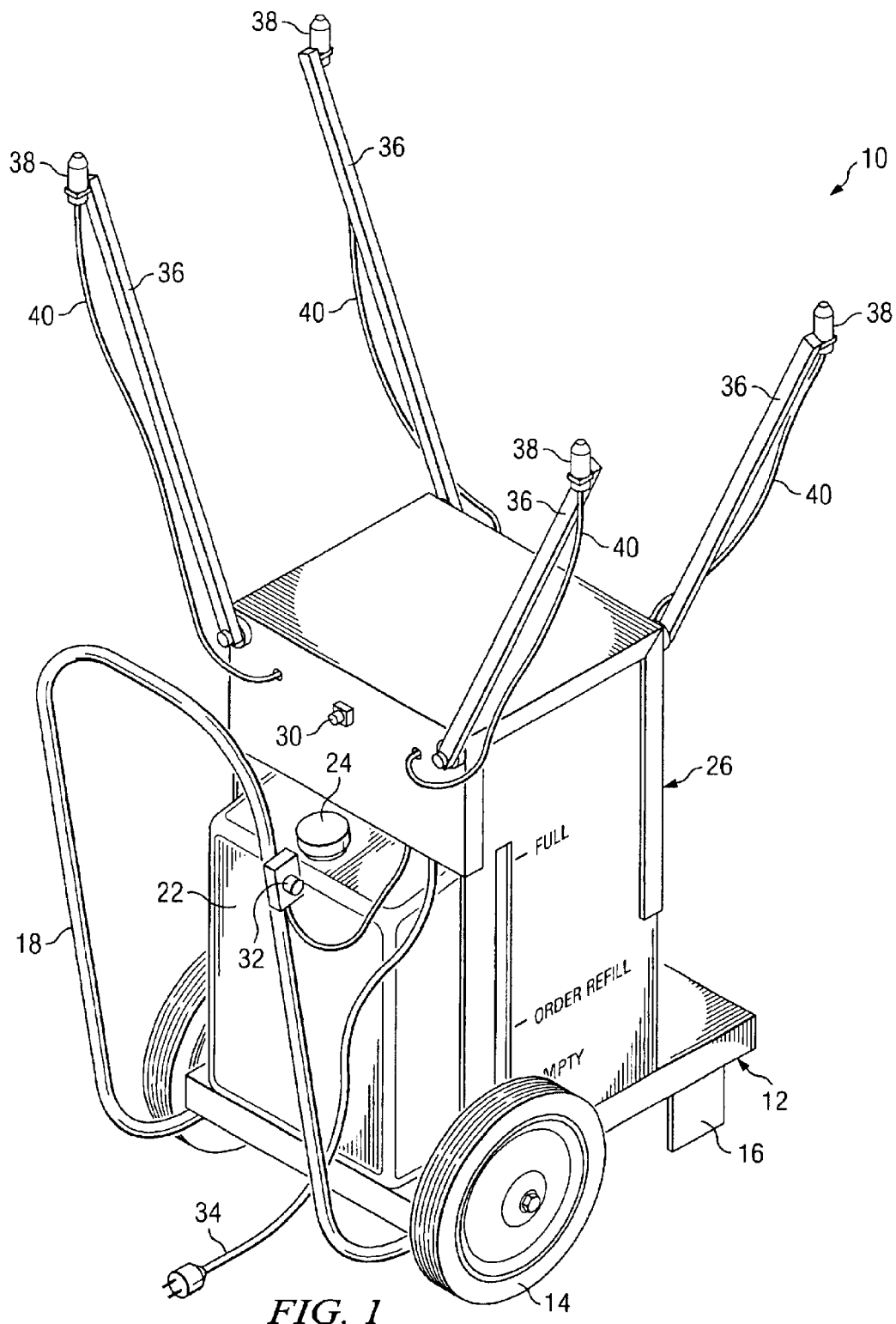
FIG. 1 is a rear perspective view of a transportable, positionable, directionable insect control system comprising the present invention.

Referring now to the Drawings, and particularly to FIG. 1, there is shown a transportable, positionable, and directionable insect control system 10 comprising a first embodiment of the present invention. The insect control system 10 includes a frame 12 which is supported on one or more wheels 14 for movement over the underlying surface. Dependent upon the design of the system 10, one or more stabilizers 16 may be located at the opposite end of the frame 12 from the wheels 14, and if used, function to stabilize the system 10 at a level orientation. Alternatively, the system 10 may be provided with multiple sets of wheels 14. A handle 18 is secured to the frame 12 and functions in conjunction with the wheels 14 to position the insect control system 10 of the present invention.

Figure 2:
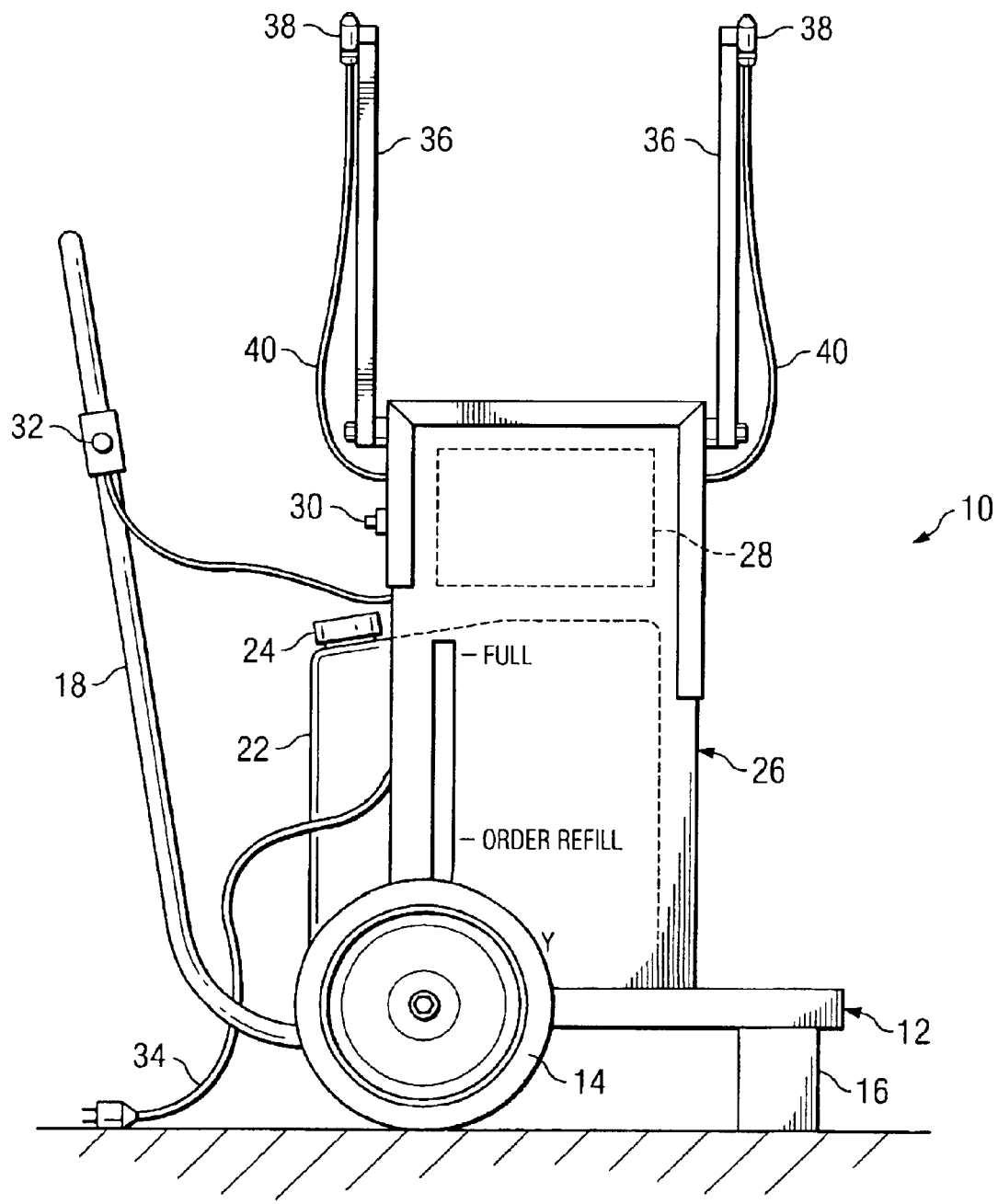
FIG. 2 is a right side view of the insect control system of FIG. 1.

A separate tank 22 is supported on the frame 12 and is provided with a fill cap 24. The tank 22 is surrounded and enclosed by a housing 26. As will be appreciated by those skilled in the art, both the tank 22 and the housing 26 are formed from non-corrosive materials such as plastics or appropriate metals. Referring specifically to FIG. 2, a pump (not shown) and a control system (not shown) are also contained within the housing 26 and may be further enclosed by an interior housing 28. The control system may include one or more devices 30 for indicating the status of the system and/or one or more devices 32 for controlling the operation of the system, if desired.

As will be further appreciated by those skilled in the art, the pump and the control system of the insect control system of the present invention require operating power. Depending upon particular applications of the invention, operating power may be provided through a typical electric cord 34. Alternatively, electric power for the pump and the control system may be provided by a rechargeable battery which is mounted on the frame 12 of the insect control system 10. If used, the rechargeable battery may be contained within the housing 26, if desired.

Referring again to FIG. 1, the insect control system of the present is provided with a plurality of discharge arms 36. The exact number of arms 36 which are utilized in any particular embodiment of the invention depends entirely upon the requirements of particular applications of the invention.

The discharge arms 36 may be fixedly supported on the housing 26. Preferably, however, the discharge arms 36 are directionable relative to the housing 26 so that the discharge therefrom is aimed precisely as required for maximum effect. The discharge arms 36 may also be adapted to telescope inwardly or pivot downwardly to facilitate transportation of the insect control system 10. Each discharge arm 36 extends to a discharge nozzle 38 mounted at the distal end thereof. In the operation of the insect control system 10, the nozzles 38 function to discharge the selected insect control chemical agent in the form of a spray, mist, or fog.

In the drawings the nozzles 38 are shown directed upwardly. However, as will be appreciated by those skilled in the art, the nozzles 38 are positionable and directionable so that the spray discharged therefrom is directed in such a manner as to achieve maximum insect control effectiveness.

Each nozzle 38 is situated at the end of a conduit which extends from the pump so that the selected insect control chemical agent discharged from the pump is directed through the conduits for discharge from the nozzles 38. Each discharge arm 36 may comprise part of the conduit extending from the pump to its respective discharge nozzle 38. Alternatively, the discharge arms 36 may support separate conduits 40 extending from the pump to the discharge nozzles 38.

In the operation thereof, the insect control system 10 is transported to a selected location utilizing an appropriate vehicle. At the selected location, the system 10 is removed from the vehicle and is thereafter positioned utilizing the wheel or wheels 14 and the handle 18. By this means, the insect control system 10 is positioned at the precise location at which insect control is required. After the insect control system is positioned, the arms 36 and the nozzles 38 may be positioned and/or directed relative to the housing 26 such that the discharge from the nozzles 38 is directed to achieve maximum insect controlling effect.

At any convenient time prior to utilization of the insect control system 10, the tank 22 thereof is filled with an appropriate concentration of a selected insect controlling chemical agent. The pump and control system contained within the housing 26 receive operating power either through an electric cord 34 or from a rechargeable battery. Upon operation of the pump, the insect controlling chemical agent is discharged from the tank through the nozzles 38 thereby effecting insect control. The pressure at which the insect controlling chemical agent is discharged and the time duration of the discharge are regulated by the control system in accordance with the requirements of particular applications of the invention.

When discharge is completed, the wheel or wheels 14 and the handle 18 may be utilized to reposition the insect control system 10 at a different area within the selected location requiring insect control. At each location the discharge from the nozzles 38 is directed for maximum effect. After all the areas of the selected location have been treated, the wheel or wheels 14 and the handle 18 may be utilized to return the insect control system to the vehicle for transport to a different location. Alternatively, the insect control system can be housed or stored at the original location for subsequent utilization.

Figure 3:
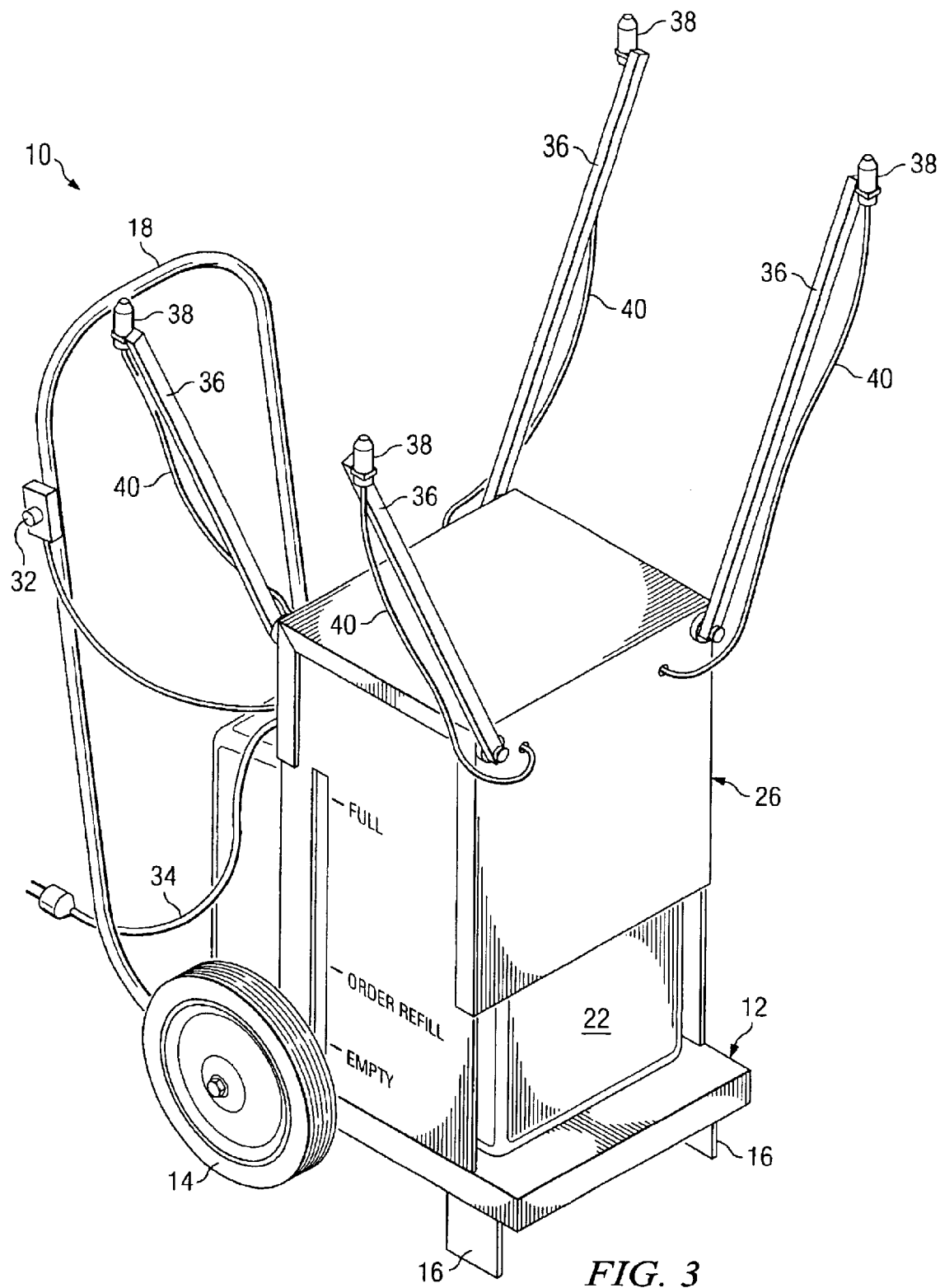
FIG. 3 is a front perspective view of the insect control system of FIG. 1.
Figure 4:
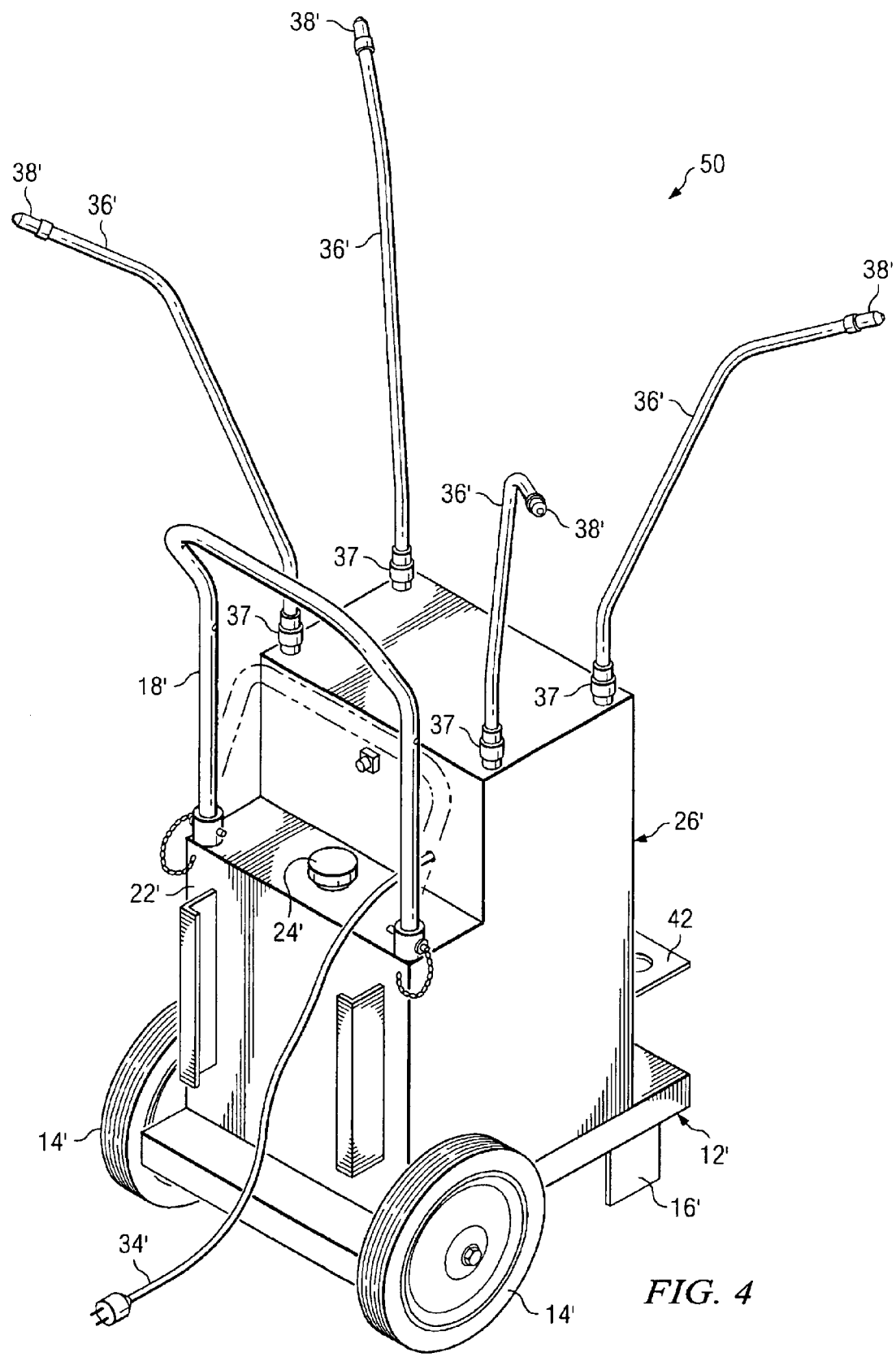
FIG. 4 is a rear perspective view of a transportable, positionable, directionable insect control system comprising a second embodiment of the present invention.

Referring now to FIG. 4, there is shown a transportable, positionable, and directionable insect control system 50 comprising a second embodiment of the present invention. Many of the component parts of the insect control system 50 are substantially identical in construction and function to component parts of the insect control system 10 illustrated in FIGS. 1–3, inclusive, and described hereinabove in connection herewith. Such identical component parts are designated in FIGS. 4–6, inclusive, with the same reference numerals utilized in conjunction with the description of the insect control system 10, but are differentiated therefrom by means of a prime (') designation.

The insect control system 50 includes a frame 12' which is supported on one or more wheels 14' for movement over the underlying surface, including rough surfaces, curbs, etc. Dependent upon the design of the system 50, one or more stabilizers 16' may be located at the opposite end of the frame 12 from the wheels 14, and if used, function to stabilize the system 50 at a level orientation. Alternatively, the frame 12' may be provided with multiple sets of wheels 14'. A handle 18' is secured to the frame 12' and functions in conjunction with the wheels 14' to position the insect control system 50 of the present invention.

Figure 5:
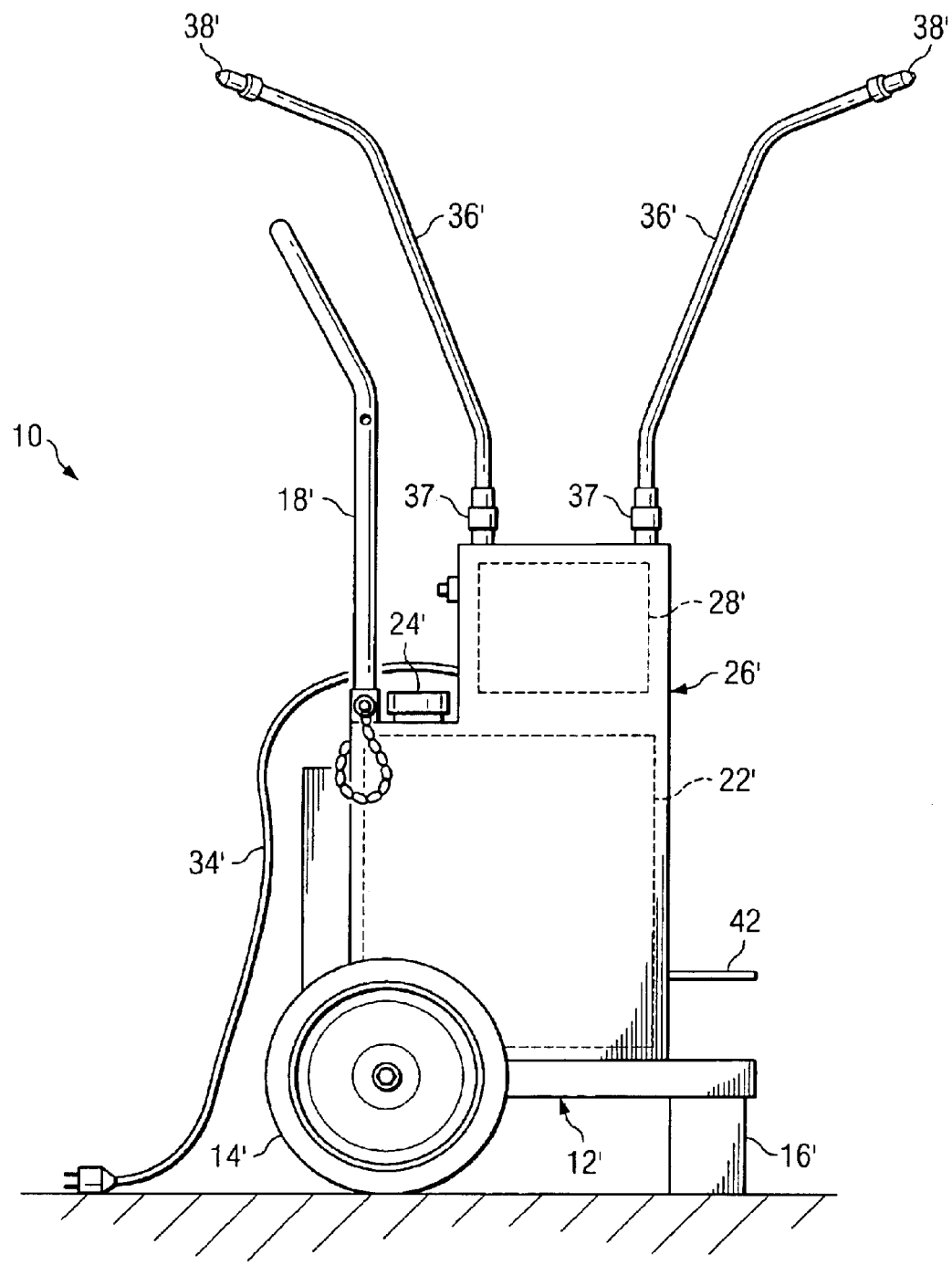
FIG. 5 is a right side view of the insect control system of FIG. 4.
Figure 6:
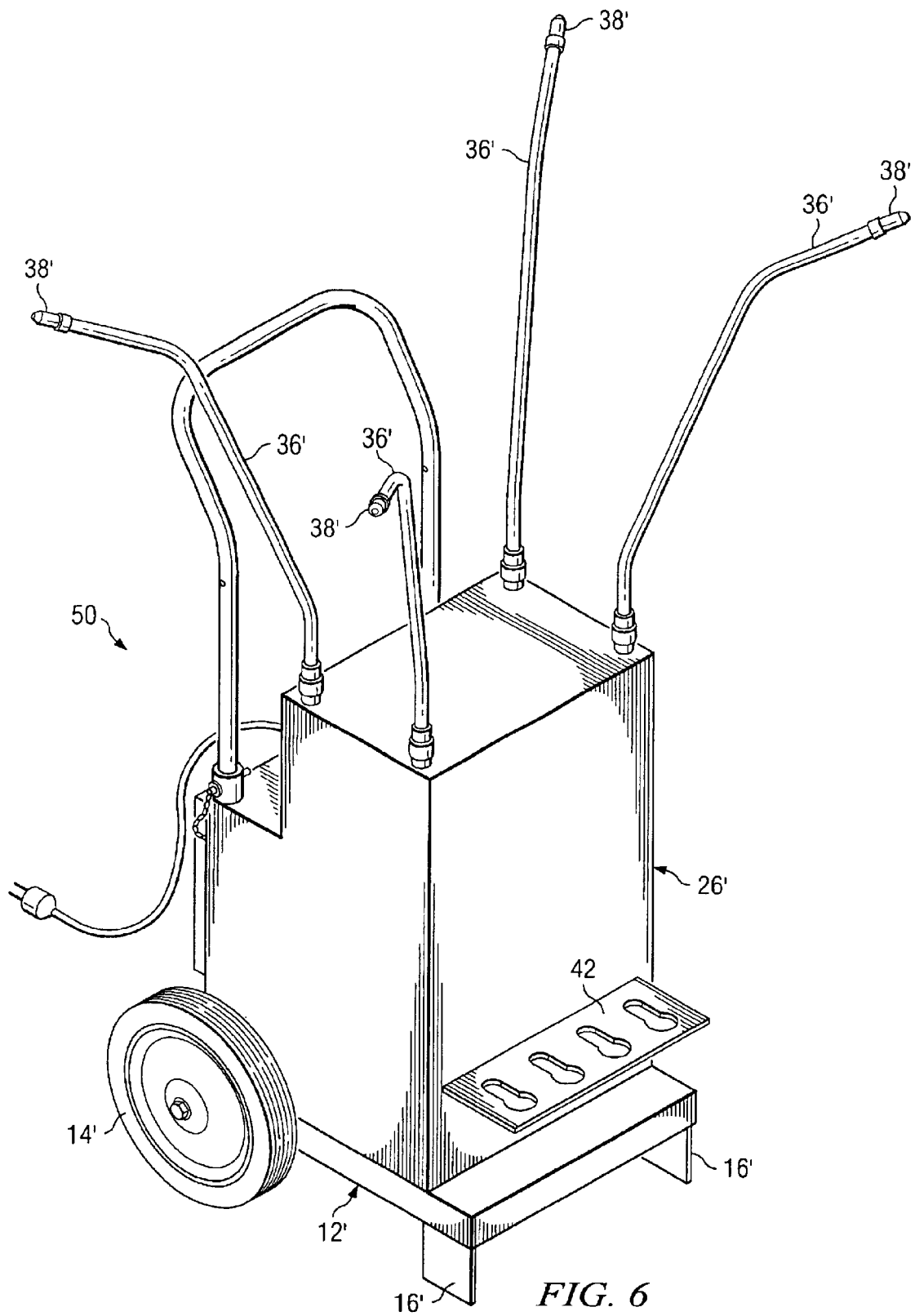
FIG. 6 is a front perspective view of the insect control system of FIG. 4.

A tank 22' is supported on the frame 12' and is provided with a fill cap 24'. The tank 22' comprises an integral part of a housing 26'. As will be appreciated by those skilled in the art, both the tank 22' and the housing 26' are formed from non-corrosive materials such as plastics or appropriate metals. Referring specifically to FIG. 5, a pump (not shown) and a control system (not shown) are also contained within the housing 26' and may be further enclosed by an interior housing 28'. The control system may include one or more devices 30' for indicating the status of the system, if desired.

As will be further appreciated by those skilled in the art, the pump and the control system of the insect control system of the present invention require operating power. Depending upon particular applications of the invention, operating power may be provided through a typical electric cord 34'. Alternatively, electric power for the pump and the control system may be provided by a rechargeable battery which is mounted on the frame 12' of the insect control system 50. If used, the rechargeable battery may be contained within the housing 26', if desired.

Referring again to FIG. 4, the insect control system of the present is provided with a plurality of discharge arms 36'. The exact number of arms 36' which are utilized in any particular embodiment of the invention depends entirely upon the requirements of particular applications of the invention.

The discharge arms 36' may be fixedly supported on the housing 26'. Preferably, however, the discharge arms 36' are directionable relative to the housing 26' so that the discharge therefrom is aimed precisely as required for maximum effect. The discharge arms 36' are secured on the housing 26 and are operatively connected to the output of the pump by quick disconnect couplings 37. The quick disconnect couplings 37 facilitate removal of the arms 36 thereby facilitating transportation and storage of the insect control system 50.

Each discharge arm 36' extends to a discharge nozzle 38' mounted at the distal end thereof. In the operation of the insect control system 50, the nozzles 38' function to discharge the selected insect control chemical agent in the form of a spray, mist, or fog. Each nozzle 38' is situated at the end of a conduit which extends from the pump so that the selected insect control chemical agent discharged from the pump is directed through the conduits for discharge from the nozzles 38'. Each discharge arm 36' comprises part of the conduit extending from the pump to its respective discharge nozzle 38'. Alternatively, the discharge arms 36' may support separate conduits extending from the pump to the discharge nozzles 38'.

In the operation thereof, the insect control system 50 is transported to a selected location utilizing an appropriate vehicle. At the selected location, the system 50 is removed from the vehicle and is thereafter positioned utilizing the wheel or wheels 14' and the handle 18'. By this means, the insect control system 50 is positioned at the precise location at which insect control is required. After the insect control system is positioned, the arms 36' and the nozzles 38' may be positioned and/or directed relative to the housing 26' such that the discharge from the nozzles 38' is directed to achieve maximum insect controlling effect.

At any convenient time prior to utilization of the insect control system 50, the tank 22' thereof is filled with an appropriate concentration of a selected insect controlling chemical agent. The pump and control system contained within the housing 26' receive operating power either through an electric cord 34' or from a rechargeable battery. Upon operation of the pump, the insect controlling chemical agent is discharged from the tank through the nozzles 38' thereby effecting insect control. The pressure at which the insect controlling chemical agent is discharged and the time duration of the discharge are regulated by the control system in accordance with the requirements of particular applications of the invention.

When discharge is completed, the wheel or wheels 14' and the handle 18' may be utilized to reposition the insect control system 10' at a different area within the selected location requiring insect control. At each location the discharge from the nozzles 38' is directed for maximum effect. After all the areas of the selected location have been treated, the wheel or wheels 14' and the handle 18' may be utilized to return the insect control system to the vehicle for transport to a different location. Alternatively, the insect control system can be housed or stored at the original location for subsequent utilization.

The insect control system 50 differs from the insect control system 10 in two additional respects. First, a rack 42 is provided at the front of the housing 26 to receive and support the arms 36, the attached portions of the quick disconnect couplings 37 and the nozzles 38 when the system 50 is not in use. In this manner transportation and storage of the system 50 is facilitated. The handle 18 is adapted for removal from the housing 26 and repositioned as shown in dashed lines in the drawings, again to facilitate to transportation and storage of the insect control system 50.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A transportable, positionable, directionable insect control mister comprising:

a frame;

at least one wheel mounted on the frame and supporting the insect control mister for movement over an underlying surface;

a handle supported on the frame for use in manually positioning the insect control mister relative to the underlying surface;

a tank mounted on the frame for receiving a quantity of a predetermined insect controlling chemical agent;

a housing supported on the frame and characterized by a substantially rectangular upper surface;

a plurality of non-flexible discharge arms each supported on the housing;

each of the discharge arms being located at a corner of the rectangular upper surface of the housing;

a plurality of discharge nozzles each supported on one of the discharge arms;

each of the discharge nozzles being selectively manually positionable relative to the housing and relative to the other discharge nozzles to direct the insect controlling chemical agent discharge therefrom in a predetermined direction;

each of the discharge nozzles for discharging the predetermined insect controlling chemical agent into engagement with flying insects;

an electric pump supported on the frame for receiving the predetermined insect controlling chemical agent from the tank and for discharging the predetermined insect controlling chemical agent through the discharge nozzles at a predetermined discharge pressure and for a predetermined time duration;

an automated electric control system mounted within the housing for regulating the discharge pressure and the time duration for discharge of the predetermined insect controlling chemical agent from the discharge nozzles under the operation of the pump; and means for supplying electric operating power to the pump and to the control system.

2. The transportable, positionable, directional insect control mister according to claim 1 wherein the predetermined insect controlling chemical agent comprises pyrethrum.

3. The transportable, positionable, directional insect control mister according to claim 1 wherein the predetermined insect controlling chemical agent comprises CEDARCIDE®.

4. The transportable, positionable, directional insect control mister according to claim 1 wherein the tank comprising an integral structure which is at least partially received within the housing.

5. The transportable, positionable, directional insect control mister according to claim 1 wherein the tank comprises an integral component of the housing.

6. The transportable, positionable, directional insect control mister according to claim 1 wherein each of the non-flexible discharge arms comprises a passageway for directing the insect controlling chemical agent from the pump to the nozzle supported thereby.

7. A method of insect control comprising the steps of:
providing a frame;
providing at least one wheel;
securing the wheel to the frame and thereby supporting the frame for movement over an underlying surface;
providing a handle;
securing the handle to the frame for use in manually positioning the frame relative to the underlying surface;
providing a tank;
supporting the tank on the frame;
providing a quantity of a predetermined insect controlling chemical agent;
receiving the quantity of the predetermined insect controlling chemical agent within the tank;
providing a housing having a substantially rectangular upper surface;
supporting the housing on the frame;
providing an electric pump;
supporting the pump on the frame;
providing an automated electric control system;
mounting the control system within the housing;
providing a plurality of non-flexible discharge arms;
mounting the non-flexible discharge arms on the housing with each of the discharge arms located at one of the corners of the rectangular upper surface of the housing;
providing a plurality of nozzles;
supporting each nozzle on one of the discharge arms;
selectively manually positioning each of the nozzles relative to the housing and relative to the other nozzles;
providing a plurality of conduits;
connecting the conduits between the pump and the discharge nozzles;
utilizing the pump to withdraw the predetermined insect controlling chemical agent from the tank and to direct the predetermined insect controlling chemical agent through the conduits for discharge from the discharge nozzles;
utilizing the automated electric control system to regulate the operation of the electric pump; and
providing means for directing electric operating power to the control system and to the pump.

8. The method according to claim 7 wherein the step of providing a predetermined insect controlling chemical agent is carried by providing a quantity of pyrethrum.

9. The method according to claim 7 wherein the step of providing a predetermined insect controlling chemical agent is carried out by providing a quantity of CEDARCIDE®.

10. The method according to claim 7 wherein the step of supporting the tank on the frame is carried out by providing a tank which is separate from the housing and by partially enclosing the tank within the housing.

11. The method according to claim 7 wherein the step of supporting the tank on the frame is carried out by providing a tank which is an integral component of the housing.

12. The method according to claim 7 wherein portions of the conduits extend through the discharge arms.

* * * * *

UNITED STATES PATENT AND TRADEMARK OFFICE
CERTIFICATE OF CORRECTION

PATENT NO.      : 6,951,073 B2
DATED           : October 4, 2005
INVENTOR(S)     : Gary Stephen Moore et al.

It is certified that error appears in the above-identified patent and that said Letters Patent is hereby corrected as shown below:

<u>Column 7,</u>
Line 9, replace "wherein the tank comprising" with -- wherein the tank comprises --.

<u>Column 8,</u>
Line 27, replace "is carried by providing" with -- is carried out by providing --.

Signed and Sealed this

Third Day of January, 2006

JON W. DUDAS
*Director of the United States Patent and Trademark Office*

UNITED STATES PATENT AND TRADEMARK OFFICE
CERTIFICATE OF CORRECTION

PATENT NO.       : 6,951,073 B2                                    Page 1 of 1
APPLICATION NO.  : 10/700262
DATED            : October 4, 2005
INVENTOR(S)      : Moore et al.

It is certified that error appears in the above-identified patent and that said Letters Patent is hereby corrected as shown below:

Item 60
Title page 1, under "Related U.S. Application Data," please replace with the following:

-- Provisional application No. 60/423,542, filed on Nov. 4, 2002. --

Signed and Sealed this

Sixth Day of January, 2009

JON W. DUDAS
*Director of the United States Patent and Trademark Office*